United States Patent [19]
Gan et al.

[11] Patent Number: 6,040,396
[45] Date of Patent: Mar. 21, 2000

[54] CURING CATALYSTS FOR CURING EPOXY RESINS

[75] Inventors: Joseph Gan, Strasbourg, France; Gabriele Badini, Sasbachwalden; Klaus E. Hoffmann, Acheuu, both of Germany

[73] Assignee: The Dow Chemical Company, Midland, Mich.

[21] Appl. No.: 08/898,092

[22] Filed: Jul. 22, 1997

[51] Int. Cl.⁷ .................................................. C08F 283/10
[52] U.S. Cl. ........................... 525/502; 525/504; 528/94; 528/117
[58] Field of Search ...................... 528/94, 117; 525/502, 525/504

[56] References Cited

U.S. PATENT DOCUMENTS

| | | | |
|---|---|---|---|
| 3,843,667 | 10/1974 | Cupery | 260/299 |
| 4,335,228 | 6/1982 | Beitchman et al. | 525/528 |
| 4,358,571 | 11/1982 | Kaufman et al. | 525/524 |
| 4,407,991 | 10/1983 | Messick | 524/83 |
| 4,725,652 | 2/1988 | Bertram et al. | 525/485 |
| 5,112,932 | 5/1992 | Koenig et al. | 528/51 |
| 5,140,079 | 8/1992 | Muskopf et al. | 525/482 |
| 5,169,473 | 12/1992 | Bertram et al. | 156/307.4 |
| 5,175,219 | 12/1992 | Burba et al. | 525/526 |
| 5,175,220 | 12/1992 | Burba et al. | 525/526 |
| 5,176,942 | 1/1993 | Burba et al. | 427/379 |
| 5,202,407 | 4/1993 | Pham et al. | 528/89 |
| 5,308,895 | 5/1994 | Gan et al. | 523/445 |
| 5,596,024 | 1/1997 | Horie et al. | 522/103 |

FOREIGN PATENT DOCUMENTS

| | | |
|---|---|---|
| 2041332 | 4/1991 | Canada . |
| 24119 | 2/1981 | European Pat. Off. . |
| 0 328 020 | 8/1989 | European Pat. Off. . |
| 0 436 921 | 7/1991 | European Pat. Off. . |
| S49-14558 | 8/1974 | Japan . |

OTHER PUBLICATIONS

Lee et al., Handbook of Epoxy Resins, pp. 20–11 (1967).
Lee et al., Handbook of Epoxy Resins, pp. 2–1–3–24 (1967).
Lee et al., Handbook of Epoxy Resins, pp. 20–15–20–20 (1967).
Tess, "Powder Coatings", Epoxy Resins—Chemistry and Technology, $2^{nd}$ Ed., pp. 772–778 (1988).
J. March, Advanced Organic Chemistry, $4^{th}$ Ed., pp. 741–743 (1992).
Abstract for PCT Patent WO 92/19089.
Abstract for JP 02053872.

*Primary Examiner*—Melvyn I. Marquis
*Assistant Examiner*—D. Aylward

[57] ABSTRACT

A formulation which contains:

(1) the nucleophilic addition adduct of an imidazole and an unsaturated compound, which contains more than one imidazole moiety per molecule; and (2) an epoxy resin, is characterized in that fewer than 50 equivalent percent of the imidazole moieties in the adduct are neutralized with acid. The adduct may serve as a curing catalyst in high or low-temperature curing. The formulation is made and applied as a powder coating for coatings or as a matrix resin in laminates. It may be used in solvent-borne or liquid systems.

17 Claims, No Drawings

CURING CATALYSTS FOR CURING EPOXY RESINS

BACKGROUND OF THE INVENTION

The present invention relates to the art of curing catalysts for epoxy resins and particularly catalysts useful for powder formulations.

It is well-known to coat articles by applying a powder which contains an epoxy resin, a curing catalyst and optionally a curing agent to a substrate. Usually, either the substrate is heated and the powder is applied while it is still hot, or the powder is applied to the cold substrate and the substrate is heated afterwards. In either case, the heat causes the powder to melt and flow to coat the substrate and then to cure. Examples of suitable processes are described in Kaufman, U.S. Pat. No. 4,358,571 (Nov. 9, 1982) at Column 5, lines 5 to 49; Lee & Neville, Handbook of Epoxy Resins at Pages 20-15 to 20—20 (McGraw-Hill Book Co. 1967); and Tess, "Epoxy Resin Coatings," Epoxy Resins (2nd Ed.) at Pages 772 to 778 (Marcel Dekker Inc. 1988). For example, coatings are applied by electrostatic spray or fluidized bed to metal substrates, which are usually heated to 140° C. to 240° C.

Many curing catalysts are known for curing both epoxy powder coatings and solvent-borne coatings systems. Examples of suitable catalysts include tertiary amines and quaternary ammoniums, and tertiary phosphines and quaternary phosphoniums. Known latent catalysts contain a salt which contains an ammonium or phosphonium moiety and the conjugate based of a weak nucleophilic acid, such as boric acid or fluoboric acid. Examples of suitable catalysts and latent catalysts include lower-alkyl ($C_1$–$C_6$)-triphenylphosphonium halide and the catalysts described in: Pham et al., U.S. Pat. No. 5,202,407 (Jan. 24, 1992); Bertram et al., U.S. Pat. No. 4,725,652 (Mar. 4, 1987); Bertram et al., EPO Patent Publication 0 328 020 A3 (Aug. 16, 1989); Muskopf et al., U.S. Pat. No. 5,140,079 (Aug. 18, 1992); Gan et al., U.S. Pat. No. 5,308,895 (May 3, 1994); and Bertram et al., U.S. Pat. No. 5,169,473 (Nov. 8, 1992). Kaufman et al., U.S. Pat. No. 4,358,571 (Nov. 9, 1982) teaches to make an adduct by reacting imidazole or a substituted imidazole with an acrylate ester, an epoxy resin or an isocyanate and then neutralizing the imidazole with a fatty acid or a dicarboxylic acid. These adducts are used as curing agents for epoxy resins at 132° C. (270° F.).

Burba et al., U.S. Pat. No. 5,175,219 (Dec. 29, 1992) teaches to: (1) react imidazolyl compounds with epoxy resin to make an adduct; and (2) to react the adduct with acrylic acid or its derivative in order to protonate amine hydrogen atoms in the adduct. The resulting adduct was reacted with epoxy resin to cure at about 120° C.

Recently, it has become desirable to apply powder coatings to new substrates which cannot withstand high temperatures, such as wood or plastic. Common curing agents and catalysts are not useful for this purpose because they cure at too high a temperature. What are needed are curable epoxy formulations which do not substantially cure with the epoxy resin at ambient temperature and which melt, flow, consolidate and cure with epoxy resins to form good cured thermosets at temperatures which will not damage temperature sensitive substrates.

Additionally, it has become desirable to cure solvent-borne epoxy formulations at temperatures lower than the common curing temperature, in order to protect the substrate and to save the time and expense of heating formulations to very high temperatures. What is needed are curing catalysts and curable epoxy formulations which are stable at ambient temperature and which cure rapidly to form good cured thermoset resins at temperatures below ordinary epoxy curing temperatures.

One aspect of the present invention is a process to make a curable formulation containing the steps of:

(1) reacting an imidazole with an unsaturated compound containing at least one activated double bond to form a nucleophilic addition adduct; and (2) preparing a formulation which contains the nucleophilic addition adduct and an epoxy resin, characterized in that fewer than 50 equivalent percent of the imidazole moieties in the nucleophilic addition adduct are neutralized with acid prior to Step (2).

A second aspect of the present invention is a curable formulation which contains:

(1) the nucleophilic addition adduct of an imidazole and an unsaturated compound containing at least one activated double bond, which adduct contains more than one imidazole moiety per molecule; and (2) an epoxy resin, in a ratio of 0.02 to 10 equivalents of nucleophilic addition adduct per equivalent of epoxy resin, characterized in that fewer than 50 equivalent percent of the imidazole moieties in the adduct are neutralized with acid.

A third aspect of the present invention is the process of curing the formulation as previously described by heating it to a temperature at which the formulation cures, characterized in that the curing temperature is less than 130° C. A fourth aspect of the present invention is a curable formulation which contains:

(1) a nucleophilic addition adduct of an imidazole and an unsaturated compound; and (2) an epoxy resin, characterized in that:

(a) the nucleophilic addition adduct is present in a catalytic quantity, and (b) the formulation further contains a curing agent for the epoxy resin.

Other aspects of the invention include the use of the nucleophilic addition adduct as a catalyst, use of the curable composition to make a coating, laminate or other composite or a molded article, and the article so made.

The adduct catalyzes epoxy-epoxy curing reactions and branching reactions. The formulations of the present invention can be cured at temperatures of about 130° C. or higher to provide cured coatings which contain fewer bubbles than similar coatings which used common curing catalysts. In addition, formulations as described in the second aspect of the invention form stable powder-coating formulation which cure at temperatures below 130° C. to provide low-temperature powder coatings for temperature-sensitive applications.

The present invention uses a nucleophilic addition adduct, which is made by reacting an imidazole with an unsaturated compound containing at least one double bond which is activated by an adjacent electron withdrawing group. For the purposes of this application, "nucleophilic addition" is used in the sense described in J. March, Advanced Organic Chemistry, 4th Ed. at Pages 741 to 743 (1992).

The unsaturated compound contains one or more activated double bond moieties (Q) per molecule. The activated double bond moieties (Q) are preferably linked to a common central moiety (A). The unsaturated compound is preferably represented by Formula I:

Formula I wherein (A) is a central moiety as described hereinafter, each Q is an activated double bond moiety, and n is a number of unsaturated moieties bonded to the central moiety. The activated double bond moieties (Q) contain an aliphatic carbon-carbon double bond adjacent to an activating electron-withdrawing group. Examples of suitable electron-withdrawing groups include aldehyde, ketone, ester, amide, nitrile, nitrate and sulfonate moieties. Examples of preferred activated double bond moieties (Q) are shown in Formula II:

Formula II

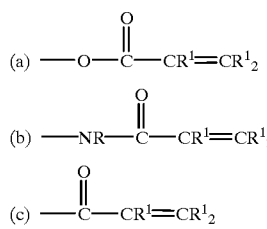

wherein each $R^1$ is independently preferably hydrogen, an aliphatic moiety, an aromatic moiety, or a link connecting the activated double bond moiety to an adjacent monomer. Each $R^1$ is more preferably hydrogen or alkyl, and most preferably hydrogen or methyl. Each $R^1$ is selected such that steric hindrance does not prevent the nucleophilic addition reaction. Each $R^1$ preferably contains no more than 12 carbon atoms, more preferably no more than 6 carbon atoms and most preferably no more than 4 carbon atoms.

Each activated double bond moiety (Q) preferably contains an ester moiety, as illustrated in Formula II (a). It is more preferably an acrylate or methacrylate moiety.

The central moiety (A) may be a single unit or an oligomer or polymer which contains multiple repeating units. The selection of the central moiety is not critical as long as it does not interfere with the synthesis or use of the adduct. The central moiety preferably contains, for example, any one or more of the following: alkyl moieties, aryl rings, ether linkages, ester linkages, aliphatic or phenolic hydroxyl groups, glycidyl ether and/or ester moieties, acid moieties, or halogen atoms. It preferably does not contain moieties which cure with epoxy resins or catalyze their curing, such as: amine moieties, carboxylic acids, acid halides or acid anhydrides, thiol groups, or hydroxyl groups. The number average formula weight of the central moiety is selected to provide an adduct having a desirable softening temperature. The number average formula weight is preferably, for example, no more than about 5,000 and more preferably no more than about 3,000. It is preferably at least about 200.

The unsaturated compound preferably contains on average at least about 0.5 activated double bond moieties per molecule, more preferably at least about 1.0 activated double bond moieties per molecule and most preferably at least about 1.5 activated double bond moieties per molecule. The maximum number of activated double bond moieties per molecule is not critical, but in most cases is preferably no more than about 10, more preferably no more than about 6 and most preferably no more than about 4. Examples of preferred unsaturated compounds include: polyacrylates and polymethacrylates, unsaturated polyesters and vinyl ester resins. Other examples include alkyl, aryl and alkaryl acrylates.

The unsaturated compound is preferably a vinyl ester resin. The vinyl ester resin is preferably a reaction product of an advanced or unadvanced epoxy resin and an unsaturated acid. The epoxy resin is preferably a poly(glycidyl ether) and more preferably an advanced or unadvanced diglycidyl ether of a bisphenol. The unsaturated acid is preferably acrylic or methacrylic acid. The reaction preferably takes place in the presence of a catalyst, such as 2,4,6-tris(dimethylaminonethyl)phenol. Examples of suitable resins and processes to make them are described in Messick, U.S. Pat. No. 4,407,991 (Oct. 4, 1983) and Wykowski, EPO Publication 0 436 921 A1 (Jul. 17, 1991). The vinyl ester resin may optionally contain unreacted epoxy moieties. The equivalent ratio of vinyl ester moieties to epoxy moieties is preferably more than 1:1, more preferably at least 3:1, more highly preferably at least 10:1 and most preferably at least 20:1.

The unsaturated compound is reacted with an imidazole to form a nucleophilic addition adduct. The selection of imidazole is not critical as long as:

(1) the imidazole selected will react with the unsaturated compound by nucleophilic addition to form an adduct; and (2) the adduct will catalyze the curing reaction of an epoxy resin either by epoxy-epoxy curing or by reaction with a curing agent. The imidazole is preferably represented by Formula III:

Formula III

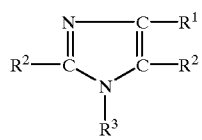

wherein each $R^2$ is independently a hydrogen atom, an aliphatic moiety or an aromatic moiety, and each $R^3$ is hydrogen or an aliphatic amine group such as a 3-aminopropyl group. Each $R^2$ is preferably hydrogen or alkyl. Each $R^2$ and $R^3$ preferably contains no more than about 12 carbon atoms, more preferably no more than about 6 carbon atoms and most preferably no more than about 4 carbon atoms. Two $R^2$ moieties on adjacent carbon atoms may optionally be linked to form a cyclic structure. Each $R^3$ is most preferably hydrogen. Examples of suitable imidazoles include imidazole, 2-methylimidazole, 2-phenylimidazole, 2-ethyl-4-methylimidazole, and N-(3-aminopropyl)imidazole.

The ratio of imidazole to unsaturated compound is preferably selected to minimize the concentration of unreacted free imidazole in the adduct. The reaction mixture may contain a stoichiometric excess of imidazole, but it preferably contains no more than about 1 mole of imidazole compound per equivalent of activated double bond moiety and most preferably no more than about 0.95 moles. The minimum concentration of imidazole in the reaction mixture is governed by practical considerations, such as the desired concentration of imidazole in the finished adduct. The reaction mixture preferably contains at least about 0.5 moles of imidazole compound per equivalent of activated double bond moiety, and more preferably at least about 0.75 moles.

The temperature of the reaction is preferably at least about 50° C. and more preferably at least about 100° C. and most preferably at least about 120° C. It is preferably no more than about 160° C. and more preferably no more than about 150° C.

The reaction preferably takes place in the presence of a polymerization inhibitor, such as hydroquinone or hydroquinone monomethylether, in order to prevent the unsaturated resin from gelling. Even so, some solutions are particularly sensitive to forming gels, so that special care must be taken. Sterically-hindered imidazoles, such as 2-ethyl-4-methylimidazole may react slowly and require additional stabilizer, such as hydroquinone, in order to provide sufficient time for the reaction to occur.

The resulting adduct contains β-imidazole moieties, which are preferably represented by Formula IV (a) and more preferably represented by Formula IV (b):

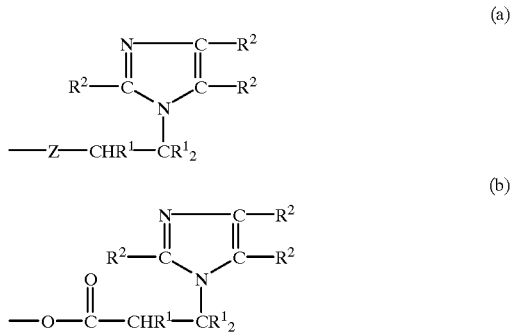

wherein each Z is an electron-withdrawing group as previously defined and each $R^1$ and $R^2$ has the definition and preferred embodiments previously given and each imidazole is preferably linked to a central moiety as previously described. The preferred number of β-imidazole moieties in the adduct depends on the intended use of the adduct, and is similar to the preferred number of activated double bond moieties in the unsaturated ester compound, as previously described.

The adduct is preferably represented by Formula I wherein at least some Q are β-imidazole moieties, and the remaining Q are activated double bond moieties. The equivalent ratio of β-imidazole moieties to activated double bond moieties is preferably at least 1:1, more preferably at least 2:1 and most preferably at least 3:1. All of the activated double bond moieties may be converted to β-imidazole moieties, but it is usually more practical that the equivalent ratio not exceed 20:1, in order to minimize free imidazole in the adduct. The adduct may optionally further contain reaction products of imidazole with epoxy moieties or other reactive groups in the unsaturated compound.

The softening point of the adduct is preferably high enough that the adduct is solid at ordinary storage temperatures, but low enough so that the adduct softens and consolidates with powder epoxy resin at the desired reaction temperature. The Mettler softening point of the adduct, as measured by the test set out in the Examples, is preferably at least about 50° C., more preferably at least about 60° C. and most preferably at least about 80° C. It is preferably less than 130° C. and more preferably less than 100° C.

The number average molecular weight of the adduct is preferably at least about 400 and more preferably at least 500. It is preferably no more than about 1,500 and more preferably no more than about 1,100. The weight average molecular weight of the adduct is preferably at least about 400 and more preferably at least about 500. It is preferably no more than about 2,500 and more preferably no more than about 1,200.

The melt viscosity of the adduct (as measured at 150° C. using an ICI Cone and Plate Viscometer with a type C cone) is preferably at least about 90 mPa.s and more preferably at least about 140 mPa.s. It is preferably no more than about 2,000 mPa.s and more preferably no more than about 1,500 mPa.s.

The adduct ideally contains essentially no (0 weight percent) unbound imidazole, which has not reacted with the unsaturated compound, but that result is frequently impractical to achieve. Preferably no more than about 50 weight percent of the imidazole is unbound imidazole, more preferably no more than about 30 weight percent and most preferably no more than about 20 weight percent. The minimum percentage of unbound imidazole is limited by practical considerations, such as steric hindrance, and is usually at least 1 weight percent.

In the prior art, imidazole moieties have typically been neutralized with an organic acid before they are made part of the epoxy formulation. In the present invention, at least a substantial portion of the imidazole moieties should not be protonated (neutralized). Preferably, at least about 50 mole percent of the imidazole moieties are unprotonated, more preferably at least about 75 mole percent are unprotonated, more highly preferably at least about 90 mole percent are unprotonated, and most preferably at least about 95 mole percent are unprotonated. As many as 100 percent may be unprotonated. Imidazole moieties which are unprotonated preferably exist in their free-base state.

Formulations of the present invention further contain an epoxy resin. The epoxy resin is preferably a glycidyl ether or ester compound, more preferably a glycidyl ether compound and most preferably an advanced or unadvanced diglycidyl ether of a bisphenol, such as bisphenol A or bisphenol F. The epoxy resin may be advanced or unadvanced, but it is preferably advanced and more preferably a solid at about 25° C.

Its epoxy equivalent weight (EEW) is preferably at least about 100, more preferably at least about 200 and most preferably at least about 500. Its maximum EEW is not critical, but is preferably no more than about 2,500, more preferably no more than about 2,000 and most preferably no more than about 1,500. Its Mettler softening point is preferably at least about 50° C., more preferably at least about 60° C. and most preferably at least about 65° C. Its Mettler softening point is preferably less than 130° C. and more preferably less than about 100° C.

Examples of suitable epoxy resins include epoxy powder coating resins, epoxy novolac resins, high- and medium-molecular weight solution epoxy resins, MDI-modified epoxy resins, glycidyl (meth)acrylate polymers or copolymers and liquid epoxy resins and blends thereof. Specific examples of epoxy resins useful in the present invention include bisphenol A, bisphenol F, and tetrabromobisphenol A. A broad range of suitable epoxy resins are commercially available. Processes to make others are familiar to persons skilled in the art and described in numerous general publications, such as Lee & Neville, Handbook of Epoxy Resins at Pages 2-1 to 3-24 (McGraw-Hill Book Co. 1967). The epoxy resins may also be the advanced products of liquid epoxy resins and tetrabromobisphenol A or the epoxy functional oxazolidone containing copolymers described in U.S. Pat. No. 5,112,932.

The optimum proportion of adduct to epoxy resin generally depends upon the contents and intended use of the formulation.

When the adduct catalyzes curing without a separate curing agent or cross-linker, the equivalent ratio is preferably at least about 0.02 equivalents of adduct per equivalent of epoxy resin, more preferably at least about 0.05 equivalents and most preferably at least about 0.2 equivalents. The maximum concentration is not critical, but is preferably no more than about 10 equivalents of adduct per equivalent of epoxy resin, more preferably no more than about 5 equivalents, more highly preferably no more than about 2 equivalents and most preferably no more than about 1 equivalent. The weight ratio of epoxy resin to adduct is preferably at least 1:10, more preferably at least 1:1 and most preferably at least 2:1. The weight ratio of epoxy resin to adduct is preferably no more than 10:1, more preferably no more than 5:1 and most preferably no more than 3:1.

When the formulation contains a curing agent and is cured at elevated temperatures, then a much smaller quantity of adduct is preferred. The equivalent ratio is preferably at least about 5 milliequivalents (meq) of adduct per equivalent of epoxy resin, more preferably at least about 20 meq and most preferably at least about 80 meq. The maximum concentration is not critical, but is preferably no more than about 200 meq of adduct per equivalent of epoxy resin, more preferably no more than about 150 meq, more highly preferably no more than about 100 meq and most preferably no more than about 50 meq. The weight ratio of epoxy resin to adduct is preferably at least about 1 parts per 100 parts resin (phr), more preferably at least about 3 phr and most preferably at least about 5 phr. The weight ratio of epoxy resin to adduct is preferably no more than about 15 phr, more preferably no more than about 10 phr and most preferably no more than about 5 phr.

Suitable curing agents for use in such formulations vary depending upon the intended use of the formulation, and are familiar to persons skilled in the art. Several suitable curing agents are taught in Lee & Neville, supra, at Page 20-11 and in Tess, supra, at Pages 776–778. Examples of suitable curing agents include dicyandiamide and other amines and amides, polyhydric phenols, and polyanhydrides. The optimum ratio of curing agent to epoxy resin varies depending upon the curing agent selected and the intended use of the resin. Usually, the equivalent ratio of curing agent to epoxy resin is preferably 0.1:1 to 10:1, and more preferably 0.2:1 to 2:1.

The formulation which contains sufficient adduct to catalyze epoxy-epoxy curing may further contain a curing agent. The equivalent ratio of adduct to curing agent is preferably at least 25:75, more preferably at least 50:50, more highly preferably at least 75:25 and most preferably at least 90:10.

The formulation may optionally contain a solvent, but preferably it does not and more preferably it is a powder coating formulation. The solvent, if any, is preferably organic. Suitable organic solvents are well-known and commercially available. The selection is not critical. Examples of suitable solvents include: xylenes, glycol ethers, ketones, toluene, alcohols and dimethylformamide. The concentration of solids in the solvent is not critical, but is governed by practical considerations such as viscosity, cost and the need to recover solvents from effluent. It is preferably between 20 and 80 weight percent and more preferably between 40 and 60 weight percent, in most cases.

The formulation may optionally contain other additives which are useful for its intended use. For example, coating formulations may optionally contain: stabilizers, surfactants and flow modifiers, fillers, pigments and matting agents. Laminate and composite making formulations may optionally contain stabilizers, fillers, flow-modifiers and chopped fibers. The concentration of additives other than pigments, fillers and chopped fibers in the formulation is preferably no more than about 5 weight percent and more preferably no more than about 3 weight percent. The concentration of chopped fibers, fillers and pigments is preferably no more than about 80 weight percent and more preferably no more than about 50 weight percent. The concentration of any or all may be 0 weight percent.

The formulation which cures by epoxy-epoxy homopolymerization preferably cures at a temperature of at least about 80° C., more preferably at a temperature of at least about 90° C. and most preferably at a temperature of at least about 100° C. It preferably cures at a temperature of less than 130° C., more preferably at a temperature of less than 120° C. and most preferably at a temperature of no more than about 110° C. However, it can be used at temperatures of 200° C. or higher.

The formulation which contains a smaller quantity of adduct and a separate curing agent is preferably cured at a temperature of at least about 120° C., more preferably at least about 130° C. and most preferably at least about 150° C. The maximum curing temperature varies depending upon intended use, but in most cases it is preferably no more than about 250° C. and more preferably no more than about 220° C.

Formulations of the present invention may be used in ordinary epoxy uses, such as coating, laminating and molding applications. For instance:

(a) Solution coating formulations may be:
  (1) applied to a substrate by known means such as spraying, brushing, rolling, immersion or electrodeposition; and
  (2) cured by heating to a suitable curing temperature.

(b) Powder coating formulations may be applied by:
  (1) heating a substrate to a suitable curing temperature for the formulation; and
  (2) applying the formulation by known means such as electrostatic spray or fluidized bed.

They may also be applied by:
  (1) applying the powder to the cold substrate, such as with an electrostatic application method; and
  (2) heating the powder and substrate to a temperature at which the powder flows and cures.

(c) Laminates may be made by:
  (1) impregnating the formulation onto a fiberous substrate and heating to form a prepreg; and
  (2) pressing two or more layers of prepreg together at a temperature suitable to cure the formulation.

(d) Molding may be made by:
  (1) injecting the formulation into a mold, which optionally contains a fiberous substrate; and
  (2) heating the formulation to cure it.

The catalysts of the present invention may also be used in electrical laminate application either via powder coating or solvent home systems such as described in U.S. Pat. No. 5,112,932.

The invention is further exemplified by the following working examples.

WORKING EXAMPLES

The following examples are for illustrative purposes only and should not be taken as limiting either the specification or the claims.

Manufacture of Adducts. The specific reagents for making adducts of the present invention, and the properties of the adducts, are shown in Table I hereafter.

The adducts were manufactured using the following general procedure:
  (1) Optionally, an advanced epoxy resin was made. A sample of D.E.R.™ 330 (trademark of The Dow Chemical Company) liquid epoxy resin was reacted with bisphenol A in the presence of a phosphonium advancement catalyst at about 140° C. under nitrogen atmosphere. The quantity of each reagent and the EEW of the resulting advanced resin are shown in Table I. (Throughout the Tables, the quantity of reagents is expressed in terms of parts-by-weight (pbw), unless otherwise stated.)

(2) A vinyl ester resin was made. The advanced resin from Step (1), or a sample of D.E.R.* 330 liquid epoxy resin, was heated to 80° C. to 100° C. and a constant stream of air was bubbled through the resin. About 500 ppm of hydroquinone was added as an inhibitor and acrylic or methacrylic acid was added. A 750 ppm portion of ANCAMINE K54 catalyst was added and the temperature was raised to about 120° C. When the residual epoxy concentration was about 7 or 8 percent, a second 750 ppm portion of ANCAMINE K54 catalyst was added. When the residual epoxy reached the concentration shown in Table I, the reaction was discontinued and the temperature was lowered. The air stream was reduced and the vinyl ester resin was purged with nitrogen. The reagents and the residual epoxy content of the vinyl ester resin are shown in Table I.

(3) The imidazole adduct of the vinyl ester resin was formed. The imidazole shown in Table I was added in several portions over a space of about 15 minutes to moderate the resulting exotherm. Thereafter, the temperature was slowly increased to 140° C. over 15 minutes and the mixture was permitted to react for 60 minutes at 140° C. The product was recovered and permitted to cool. The residual imidazole in the adduct was measured with HPLC.

(4) The Mettler softening point was measured using the following method, which has been published as Method RPM-108C of The Dow Chemical Company, which is a variation of ASTM D 3104. The softening point in RPM-108C is defined as the temperature at which an epoxy resin suspended in a cylindrical cup with a 6.35 mm hole in the bottom flows downward a distance of 19 mm as it is heated at a linear rate in air.

The sample is ground to a size of less than 5 mm. A sample cup with a 6.35 mm hole in the bottom is placed on aluminum foil on a hot plate at 150° C. (for low molecular weight samples) or 200° C. (for high molecular weight samples). The granulated sample is added to the cup until it is full of molten, bubble free resin. The cup and foil are removed from the plate and allowed to cool; then the foil is peeled off and excess resin is removed from the outside of the cup. The cup is placed in a Model FP5/53 softening point apparatus from Mettler Instrument Co. The apparatus contains a furnace and light beams which are interrupted when the sample flows out of the cup. The furnace temperature is set to 20° C. below the expected melting temperature of the sample, and the sample is left for at least 30 seconds to equilibrate. Then the temperature is raised at 2° C. per minute until a drop formed under the hole breaks the light beam.

(5) The melt viscosity was measured using an ICI Cone and Plate Viscometer with a C cone at about 150° C. The average molecular weight was determined by gas-phase chromatography. The reagents and the properties of the adduct are all shown in Table I.

For the purposes of Table I: "Im" means imidazole, "2-MI" means 2-methylimidazole, "2-PhI" means 2-phenylimidazole and "2E4MI" means 2-ethyl-4-methylimidazole.

TABLE I

| Adduct | 1 | 2 | 3 | 4 | 5 | 6 |
|---|---|---|---|---|---|---|
| Liquid Epoxy Resin (pbw) | 559 | 539 | 48.94 | 55.10 | 46.5 | 48.46 |
| Bisphenol A (pbw) | — | 57.8 | — | — | — | 5.2 |
| Epoxy Equivalent Weight | 180 | 240 | 180 | 180 | 180 | 240 |
| Methacrylic Acid (pbw) | — | 209.7 | 22.82 | 21.17 | — | — |
| Acrylic Acid (pbw) | 210 | — | — | — | 18.27 | 15.78 |
| Residual Epoxy (%) | 0.6 | 1.0 | 1.0 | 3.6 | <1 | 1.5 |
| Imidazole Selection | 2-MI | 2-MI | 2E4MI | 2-MI | 2-PhI | 2-PhI |
| Imidazole Quantity (pbw) | 231 | 193.4 | 28.23 | 23.73 | 35.27 | 30.56 |
| Residual Imidazole (%) | 1.2 | 5.7 | 16.3 | 5.9 | 6.1 | 6.2 |
| Softening point (° C.) | 78 | 71.9 | 65.8 | 76.9 | 82.1 | 89.4 |
| Melt viscosity (mPa · s @ 150° C.) | 370 | 190 | 110 | 360 | 270 | 600 |
| $M_n$ | — | 726 | 704 | 658 | 612 | 516 |
| $M_w$ | — | 908 | 777 | 742 | 878 | 1070 |
| $M_z$ | — | 1177 | 878 | 846 | 1101 | 1857 |
| Polydispersity | — | 1.25 | 1.10 | 1.13 | 1.43 | 2.07 |

| Adduct | 7 | 8 | 9 | 10 | 11 | 12 |
|---|---|---|---|---|---|---|
| Liquid Epoxy Resin (pbw) | 54.97 | 52.77 | 55.21 | 55.00 | 56.89 | 539.1 |
| Bisphenol A (pbw) | — | — | 11.25 | — | 11.59 | — |
| Epoxy Equivalent Weight | 180 | 180 | 320 | 180 | 320 | 180 |
| Methacrylic Acid (pbw) | 25.63 | 24.61 | 17.59 | — | — | 235.8 |
| Acrylic Acid (pbw) | — | — | — | 21.57 | 15.10 | — |
| Residual Epoxy (%) | 1.0 | 1.0 | 1.17 | 0.95 | 0.85 | 1.46 |
| Imidazole Selection | Im | 2-MI | 2-MI | 2-MI | 2-MI | 2-MI |
| Imidazole Quantity (pbw) | 19.4 | 22.62 | 15.95 | 23.43 | 16.42 | 225.1 |
| Residual Imidazole (%) | 4.6 | 4.7 | 6.1 | 1.2 | 0.6 | 4.1 |
| Softening point (° C.) | 62.8 | 69.3 | 84.2 | 77.9 | 92.6 | 72 |
| Melt Viscosity (mPa · s @ 150° C.) | 160 | 140 | 680 | 370 | 1520 | 1400* |
| $M_n$ | 576 | 529 | 1060 | 790 | 1139 | — |
| $M_w$ | 639 | 579 | 1716 | 972 | 1920 | — |
| $M_z$ | 699 | 625 | 2675 | 1284 | 3088 | — |
| Polydispersity | 1.11 | 1.09 | 1.62 | 1.23 | 1.69 | — |

*measured at 120° C.

Example 1

Lamination

Adduct 12 was dissolved to 65 percent solids concentration in methyl ethyl ketone. A mixture of 10 g of the adduct solution and 125 g of D.E.R.™ 691 A80 epoxy resin solution was impregnated upon 15 cm by 15 cm square pieces of woven E glass type 7628 (woven E glass type 7628 is commercially available from Inter Glass). The impregnated sheets were heated for 4 minutes at 80° C. in a hot air circulated oven to evaporate the solvent. The resulting prepregs contained 60 to 65 percent resin.

Five plies of prepreg were laid up between two sheets of copper foil and pressed at 110° C. and 0.2 bar (24 MPa) pressure for 20 minutes. The resulting laminate had a glass-transition temperature of 69° C.

The experiment was repeated using 12 g of the adduct solution. The resulting laminate had a glass-transition temperature of about 99° C.

Both laminates had a good appearance.

Examples 2–16

Powder Coating

Epoxy Resin A was made by: First mixing 6,830 g of D.E.R.™ 330 liquid epoxy resin and 3,170 g of ER grade bisphenol A with 500 ppm of phosphonium advancement catalyst at 100° C. under nitrogen atmosphere with stirring. Next, heating the mixture to 140° C. Next, reacting at 140° C. for about 2 hours until the viscosity of the resin was about 5,000 mPa.s at 120° C. Next, quenching the catalyst by adding the methyl ester of p-toluenesulfonic acid. Next, stirring for 30 minutes and then allowing to cool and solidify. The target EEW for the resin was about 1,000.

Epoxy Resin B was made by the same procedure, except that 6.6 weight percent D.E.N.™ 438 (trademark of The Dow Chemical Company) epoxy novolac resin was added to the reaction mixture immediately after the methyl ester of p-toluenesulfonic acid.

Two 70 g samples of D.E.H.™ 85 (trademark of The Dow Chemical Company) phenolic hardener were melted at 140° C. under nitrogen atmosphere. Thirty grams of Adduct 1 were mixed into the first sample (Hardener A) and 30 g of Adduct 2 were mixed into the second (Hardener B). The mixtures were stirred for 15 minutes and then cooled to room temperature.

The epoxy resins, hardeners and additives shown in Table II were mixed in a laboratory mixer in the proportions shown in Table II for 2 minutes at 420 rpm. The mixture was melt extruded in a twin-screw extruder at 65° C. and 300 rpm. The extrudate was cooled, chipped, ground and sieved to yield a powder. The powder was applied to steel panels using electrostatic spray and the panels were cured in an oven at 110° C., 120° C. and 130° C. for 20 minutes. The coatings were tested for:

Flow—By visual inspection and comparison to a high temperature powder-coated sample. For results, 0=poor and 4=excellent.

Flexibility—using the Erichsen indentation test.

Impact Resistance—using the ASTM D2794-84 test using 4 lb. (1.8 kg) weights applied across an area which is ½ inch (1.25 cm) in diameter. The test measures the number of in-lbs (N-m) force which could be applied without damage.

Gloss at 20 degree angle of reflection—using the DIN 55 990 test.

All tests were repeated using powder which had been aged for 6 days at 35° C. All results are shown in Table II.

TABLE II

| | Example | | | | | | | | |
|---|---|---|---|---|---|---|---|---|---|
| | 2 | 3 | 4 | 5 | 6 | 7 | 8 | 9 | 10 |
| Epoxy Resin A (pbw) | 532.8 | 532.8 | 532.8 | 532.8 | 532.8 | 532.8 | — | — | — |
| Epoxy Resin B (pbw) | — | — | — | — | — | — | 461.3 | 461.3 | 461.3 |
| Hardener A (pbw) | 59.2 | 59.2 | 59.2 | 59.2 | 59.2 | 59.2 | — | — | — |
| Hardener B (pbw) | — | — | — | — | — | — | 80 | 80 | 80 |
| MODAFLOW MFIII (pbw) | 8.0 | 8.0 | 8.0 | 8.0 | 8.0 | 8.0 | 8.1 | 8.1 | 8.1 |
| Titanium dioxide (pbw) | 400 | 400 | 400 | 400 | 400 | 400 | 405.4 | 405.4 | 405.4 |
| Aged for: (days) | 0 | 0 | 0 | 6 | 6 | 6 | 0 | 0 | 0 |
| Applied at: (° C.) | 110 | 120 | 130 | 110 | 120 | 130 | 110 | 120 | 130 |
| Flow | 2 | 2.5 | 3 | 1.5 | 2.5 | 3 | 3 | 3.5 | 4 |
| Erichsen Indentation (mm) | — | 8.3 | 8.9 | — | 8.0 | 8.3 | — | 8 | 7 |
| Impact resistance in-lbs (N-m) | — | 160 (18.1) | 160 (18.1) | — | 160 (18.1) | 160 (18.1) | — | 140 (15.8) | 160 (18.1) |
| Gloss (%) | — | 101 | 100 | — | 96 | 98 | — | 92 | 93 |

| | Example | | | | | |
|---|---|---|---|---|---|---|
| | 11 | 12 | 13 | 14 | 15 | 16 |
| Epoxy Resin A (pbw) | — | — | — | — | — | — |
| Epoxy Resin B (pbw) | 461.3 | 461.3 | 461.3 | 461.3 | 461.3 | 461.3 |
| Hardener A (pbw) | — | — | — | — | — | — |
| Hardener B (pbw) | 80 | 80 | 80 | 80 | 80 | 80 |
| MODAFLOW MFIII (pbw) | 8.1 | 8.1 | 8.1 | 8.1 | 8.1 | 8.1 |
| Titanium dioxide (pbw) | 405.4 | 405.4 | 405.4 | 405.4 | 405.4 | 405.4 |
| Aged for: (days) | 7 | 7 | 7 | 14 | 14 | 14 |
| Applied at: (° C.) | 110 | 129 | 130 | 110 | 120 | 130 |
| Flow | 2 | 3 | 3 | 1 | 2 | 3 |
| Erichsen Indentation (mm) | — | — | — | — | 6.3 | 7.4 |

TABLE II-continued

| | | | | | | |
|---|---|---|---|---|---|---|
| Impact resistance in-lbs (N-m) | — | — | — | — | 160 (18.1) | 160 (18.1) |
| Gloss (%) | — | 92 | 93 | — | 90 | 93 |

Example 17

A diethanolamine-modified phenolic hardener was made by: (1) mixing 32.8 parts by weight (pbw) liquid epoxy resin and 62.7 pbw bisphenol A at 100° C. under nitrogen; (2) adding 4.5 pbw diethanolamine which had been melted at 50° C.; and (3) after the exotherm reached 180° C., cooling to 150° C. and maintaining there for 30 minutes.

Ninety parts by weight of the adduct from Example 1 was mixed at 140° C. for 15 minutes under nitrogen atmosphere with 10 parts by weight of a phenol novolac resin having a hydroxyl equivalent weight of about 104. The resulting hardener composition had a Mettler softening point of about 83° C. and a melt viscosity of 3,840 mPa.s at 120° C.

A powder coating formulation was made according to the procedures in claims 2–16. It contained: 10.9 pbw diethanolamine-modified phenolic hardener, 3.5 pbw of the hardener composition containing the adduct, 24.9 pbw D.E.R.™ 672U epoxy resin, 30.7 pbw D.E.R.™ 642U epoxy resin, 5 pbw titanium dioxide, 22 pbw BaSO₄, 2 pbw mica and 1 pbw MODAFLOW MFIII flow modifier. The formulation was applied using an electrostatic sprayer to 6 mm steel panels which had been preheated to 245° C. The coatings were cured for 2.5 minutes at 245° C. The powder was also applied manually to a glass plate which was preheated to 235° C. and cured for about 2 minutes. The plate was observed through a microscope and essentially no bubbles could be seen.

Example 18

Using the procedure from Example 17, Adduct 8 was melt blended for 30 minutes at 140° C. with a phenol novolac resin having a hydroxy equivalent weight of about 104. The weight ratio of adduct to novolac resin was 90:10. After the blending was completed, the blend had a softening point of 86.7° C., a melt viscosity of 440 mPa.s at 150° C., and a melt viscosity of 3360 mPa.s at 120° C.

A powder formulation containing:

636.8 parts-by weight (pbw) D.E.R.* 661E epoxy resin;
55.2 pbw of the blend;
300 pbw KRONOS 2310 (commercially available from Kronos Co.) titanium dioxide; and
8.0 pbw MODAFLOW MFIII (commercially available from Monsanto Co.) flow-modifier was prepared using the procedure from Examples 2–16.

The formulation was applied to steel panels as described in Examples 2–16 and cured for 20 minutes at 120° C. and 110° C. It was also applied and cured at 100° C. for 30, 45, 60 and 75 minutes. The coatings were tested as in Examples 2–16. The results are set out in Table III. All panels withstood 200 acetone rubs without visible damage.

TABLE III

| Time (minutes) | Temperature (° C.) | Thickness (μm) | 20° C. Gloss | 60° C. Gloss | Erichsen Dimple (mm) | Impact in-lbs. (N-m) |
|---|---|---|---|---|---|---|
| 20 | 110 | 566 | 100 | 103 | 3.8 | 110 (11) |
| 20 | 120 | 56 | 99 | 103 | 4.6 | 90 (10) |
| 30 | 100 | 59 | 97 | 102 | 5.6 | 30 (3) |
| 45 | 100 | 53 | 100 | 101 | 4.6 | 50 (6) |
| 60 | 100 | 59 | 99 | 101 | 6.0 | 50 (6) |
| 75 | 100 | 67 | 99 | 101 | 4.1 | 40 (5) |

We claim:

1. A process to make a curable formulation comprising the steps of:
   (1) reacting an imidazole with an unsaturated compound, which contains at least one activated double bond, to form a nucleophilic addition adduct which contains more than one imidazole moiety per molecule; and
   (2) preparing a formulation which contains the nucleophilic addition adduct and an epoxy resin, characterized in that fewer than 50 equivalent percent of the imidazole moieties in the nucleophilic addition adduct are neutralized with acid prior to step (2); wherein said adduct has a Mettler softening point of at least about 50° C. and a melt viscosity measured at 150° C. of at least about 90 mPa·s.

2. The process as described in claim 1 wherein no more than 25 percent of the imidazole moieties in the adduct are neutralized with acid.

3. The process as described in claim 2 wherein no more than 10 percent of the imidazole moieties in the adduct are neutralized with acid.

4. The process as described in claim 3 wherein no more than 5 percent of the imidazole moieties in the adduct are neutralized with acid.

5. The process as described in claim 4 wherein the imidazole is any of unsubstituted imidazole, 2-methylimidazole, 2-ethyl-4-methylimidazole, 2-phenylimidazole or N-(3-aminopropyl)imidazole.

6. A curable formulation comprising:
   (1) the nucleophilic addition adduct of an imidazole and an unsaturated compound, which adduct contains more than one imidazole moiety per molecule; and
   (2) an epoxy resin,
   in a ratio of 0.05 to 10 equivalents of nucleophilic addition adduct per equivalent of epoxy resin, characterized in that fewer than 50 equivalent percent of the imidazole moieties in the adduct are neutralized with acid; wherein said adduct has a Mettler softening point of at least about 50° C. and a melt viscosity measured at 150° C. of at least about 90 mPa·s.

7. A process to cure a formulation as described in claim 6 by heating the formulation to a temperature at which it cures, characterized in that the curing temperature is less than 130° C.

8. The process as described in claim 7 wherein the curable formulation is a powder coating formulation.

9. A curable formulation comprising:

(a) an epoxy resin;

(b) a curing agent for the epoxy resin in an equivalent ratio of 0.05 to 10 equivalents of curing agent per equivalent of epoxy resin, and (c) a catalytic amount of catalyst for the reaction of the epoxy resin with the curing agent, characterized in that the catalyst is a nucleophilic addition adduct of an imidazole and an unsaturated compound in which fewer than 50 equivalent percent of the imidazole moieties in the adduct are neutralized with acid; wherein said adduct has a Mettler softening point of at least about 50° C. and a melt viscosity measured at 150° C. of at least about 90 mPa·s.

10. A curable formulation as described in claim 9 wherein the concentration of the adduct is 5 to 200 milliequivalents per equivalent of epoxy resin.

11. A catalyst and/or curing agent product for epoxy resins comprising the reaction product of an imidazole and an unsaturated compound, which contains at least one activated double bond, to form a nucleophilic addition adduct which contains more than one imidazole moiety per molecule; wherein said adduct has a Mettler softening point of at least 50° C. and a melt viscosity measured at 150° C. of at least about 90 mPa·s.

12. The product of claim 11 wherein the imidazole has the following formula:

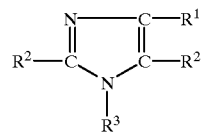

wherein each $R^1$ is independently a hydrogen atom, an aliphatic moiety, or an aromatic moiety; each $R^2$ is independently a hydrogen atom, an aliphatic moiety or an aromatic moiety; and each $R^3$ is hydrogen or an aliphatic amine group.

13. The product of claim 11 wherein the unsaturated compound has the following formula:

wherein A is a central moiety including a single unit, an oligomer or polymer which contains multiple repeating units, each Q is an activated double bond moiety, and n is a number of unsaturated moieties bonded to the central moiety.

14. The product of claim 11 wherein the unsaturated compound is an aromatic unsaturated compound.

15. The products of claim 11 wherein the unsaturated compound is a vinyl ester resin.

16. The product of claim 11 wherein the unsaturated compound is a vinyl ester resin which contains unreacted epoxy moieties.

17. The product of claim 16 wherein the ratio of vinyl ester moieties to epoxy moieties is more than 1:1 to at least about 20:1.

* * * * *